United States Patent [19]

Cheek et al.

[11] 3,907,070

[45] Sept. 23, 1975

[54] LUBRICATING APPARATUS FOR EXCAVATOR BRAKE ASSEMBLY AND SWING ASSEMBLY AND SWING TRANSMISSION

[75] Inventor: Michael Edward Cheek, Oswego, Allan Leslie Freedy, Aurora, both of Ill.

[73] Assignee: Caterpillar Tractor Company, Peoria, Ill.

[22] Filed: Dec. 9, 1974

[21] Appl. No.: 531,002

[52] U.S. Cl............... 184/6.13; 184/27 E; 417/415; 184/7 F
[51] Int. Cl.² .......................................... F01M 9/00
[58] Field of Search ............ 222/385; 214/132, 133; 192/8; 417/287, 360, 415; 184/7, 27, 61, 45, 6.13, 12

[56] References Cited
UNITED STATES PATENTS

| | | | |
|---|---|---|---|
| 1,571,845 | 2/1926 | Lefebvre | 184/27 B |
| 2,022,005 | 11/1935 | Leonard | 184/7 F |
| 2,168,122 | 8/1939 | Gausmann | 184/27 E |
| 2,499,784 | 3/1950 | Schmidt | 184/27 D |
| 2,913,985 | 11/1959 | Harrison | 417/287 |
| 3,597,119 | 8/1971 | Gratzmuller | 417/415 |
| 3,704,049 | 11/1972 | Guerrini | 184/27 R |
| 3,819,018 | 6/1974 | Muller | 192/8 R |

Primary Examiner—Richard C. Pinkham
Assistant Examiner—Marvin Siskind
Attorney, Agent, or Firm—Phillips, Moore, Weissenberger Lempio & Strabala

[57] ABSTRACT

A lubricating apparatus for the power transmission and brake assembly within a rigidly attached housing of an earth-working machine. A sump is attached to the bottom of the housing, the sump including a bore communicating at one end therewith and a piston slidably mounted to reciprocate within the bore. A shaft is rotatably mounted to pass from the housing into the sump, the shaft being rotatably driven at one end thereof by the transmission. The other end of the shaft eccentrically communicates with the piston to impart reciprocating motion thereto. A lubricant flow path is provided communicating the sump with the other end of the bore. A valve is provided at the other end of the bore, the valve communicating with conduit for directing lubricant from the sump to the transmission. The valve is designed to open responsive to pressure exerted thereon to allow lubricant to flow therethrough as the piston reciprocates toward the other end of the bore and closes to prevent lubricant from returning therethrough responsive to the piston reciprocating away from the other end of the bore.

6 Claims, 4 Drawing Figures nular. A channel 50 is provided leading from the two part housing into the case for easy return of lubricant to the sump. Normally, the sump includes lubricant 51 therein of sufficient depth to be effectively pumped into the circuit 26 by the action of the piston within the bore. A ring of bolts 52 acting through a flange 52a sealingly secures the lubricating apparatus case beneath the two part housing.

Circuit 26 which compliments lubricating apparatus 28, comprises a pair of lines 53 and 54 that communicate lubricant to transmission drive components and bearings disposed in the housing 20. Line 53 which branches from a T-fitting 56 connects to the lower end of the motor input shaft and supplies lubricant 51 thereto as, for example, in a manner illustrated and disclosed in FIGS. 2 and 3 of the aforementioned U.S. Pat. No. 3,819,018.

A pair of check valves 58 and 59 are utilized to insure proper supply and distribution of lubricant 51 by the lubricating apparatus 24. Valve 58 is located in a coupling adapter 60 with the ball 61 thereof biased by the spring 62 thereof against the seat 63 thereof. When the piston 29 travels into the bore past a passage 64, which communicates and serves as lubricant flow means with the sump 28, as is explained later, the fluid in the bore adjacent the ball 61 pressurizes the ball 61 back against the spring 62 whereby lubricant flows around the ball 61 and out of the valve 58 into the T-fitting 56. When the piston reciprocates away from the valve 58 and past the opening to the passage 64, the ball 61 seals against the seat 63. Meanwhile, referring to the bore refill valve 59, it is clear that the ball 65 thereof is biased by the spring 66 thereof against the seat 67 thereof. When the piston reciprocates away from the valve 58 a vacuum is created within the passage 64 and about the spring 66 which communicates therewith whereby the ball 65 is pulled away from the seat 67 so that lubricant can flow down past the spring 66 into the passage 64 and into the portion of the bore 30 adjacent the valve 58.

A relief valve 68 also forms a part of the preferred embodiment to the invention. The relief valve 68, as will be apparent from reference to FIG. 4, communicates at one end thereof with the passage 64 and at the other end thereof with the sump 28. The ball 69 of the relief valve 68 is biased by the spring 70 thereof against the seat 71 thereof. The spring 70 is so designed as to be stronger than the spring 62 which biases the ball 61 of the valve 58 against the seat 63 thereof so that so long as the valve 58 is operating properly the ball 69 of the valve 68 will not be moved. If, however, the valve 58 becomes stuck or if clogging develops somewhere in the circuit 26 so that lubricant cannot be forced past the valve 58, then when the piston tries to reciprocate as far as possible into the bore 30, high pressure builds up within the passage 64, said pressure being high enough to force the ball 69 of the valve 68 back against the spring 70 and to allow the flow of lubricant about the ball 69 past the spring 70 and back into the sump 28. Thus, the pressure within the circuit 26 is regulated or limited by the valve 68 and more particularly by the strength of the spring 70 thereof. The springs 72 and 73 of the valve 59 and 68 respectively simply serve to position the valves 59 and 68 relative to the passage 64 and the sump 28. The springs 72 and 73 are held in place by the simple plug connectors 74 and 75 respectively.

The piston lubricating apparatus of the present invention provides a number of advantages, not least of which is that, any solid waste material which might collect in the sump 28 can at least partially settle to the bottom thereof so that it will not be repumped readily through the circuit 26. Also, since the lubricating apparatus uses a piston pumping motion rather than, for example, a gear pumping drive therein, abrasion of the parts thereof is not critical. Further, alignment of the lubricating apparatus 24 relative to the shaft 40 is relatively easy utilizing the bolts 52 and the flange 52a. Further, if desired, a simple shim can be placed between the flange 52a and the housing 20 to aid alignment of the shaft 40 within the bearing 46. Thus, assembly problems are minimized.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In an earth-working machine, including a mobile undercarriage, an upper unit and means rotatably mounting said upper unit on said undercarriage and a power transmission, a drive motor and a brake assembly mounted on said upper unit to power rotate said upper unit relative to said undercarriage with said power transmission and said brake assembly being within a housing rigidly attached to said upper unit, an improved lubricating apparatus for said power transmission, comprising:

a sump defined by the bottom of said housing and a case removably sealingly secured therebelow, the bottom of said case serving to collect solid waste material;

a channel leading from said housing into said sump for return of lubricant thereto;

a bore communicating at one end with said sump; a piston slidably mounted to reciprocate within said bore;

a shaft rotatably mounted to said case and passing through the bottom of said housing into said sump, said shaft being rotatably driven at one end thereof by said transmission, the other end of said shaft eccentrically communicating with said piston within said sump to impart reciprocating motion thereto;

lubricant flow means communicating said sump with the other end of said bore; and valve means at the other end of said bore communicating with conduit means for directing lubricant from said sump to said transmission, said valve means opening responsive to pressure exerted thereon to allow lubricant to flow therethrough as said piston reciprocates toward said other end of said bore and closing to prevent lubricant from returning therethrough responsive to said piston reciprocating away from said other end of said bore.

2. An improvement as in claim 1, wherein said lubricant flow means includes a bore refilling valve communicating at one end thereof with said sump and at the

LUBRICATING APPARATUS FOR EXCAVATOR BRAKE ASSEMBLY AND SWING ASSEMBLY AND SWING TRANSMISSION

BACKGROUND OF THE INVENTION

The standard power transmissions employed in excavators generally comprise a motor driven speed reduction gear train and a swing pinion which rotates against a stationary ring gear to selectively rotate an upper unit relative to a mobile undercarriage. The gears of the transmission are generally lubricated by pumping lubricant therethrough under pressure, the lubricant being supplied by any of a number of conventional pumps. The present invention is particularly concerned with an improved lubricating apparatus including a piston acting pump which is part of a single unit with a sump to which lubricant is returned after it has passed over the gears of the transmission.

PRIOR ART

A number of hydraulic pumps are known in the prior art and many of these pumps are piston driven. Some typical prior art pumps are disclosed in U.S. Pat. Nos. 2,913,985; 2,929,253; 3,396,663; and 3,597,119. The use of pumps to pressurize lubricant through the power transmission of an excavator is disclosed, for example, in U.S. Pat. No. 3,819,018.

It would be highly desirable to provide an improved lubricating apparatus for a power transmission which rotates the upper unit of an excavator, which apparatus would serve as a sump to collect waste material therein, would be attached to the bottom of the housing which includes the power transmission, would operate on a simple and rugged reciprocating piston principle and would have the piston driven by a shaft activated by the power transmission being lubricated. The present invention is concerned with just such an improvement.

SUMMARY OF THE INVENTION

The invention comprises an improvement in an earth-working machine including a mobile under carriage and an upper unit with means rotatably mounting the upper unit on the under carriage and a power transmission, a drive motor and a brake assembly mounted on the upper unit to power rotate said upper unit relative to said under carriage with said power transmission and said brake assembly being within a housing rigidly attached to the upper unit. The improvement comprises a lubricating apparatus for the power transmission. The lubricating apparatus including a sump attached to the bottom of the housing, a bore communicating at one end with the sump, and a piston slidably mounted to reciprocate within the bore. Also forming a part of the apparatus is a shaft rotatably mounted to pass from the housing into the sump, the shaft being rotatably driven at one end thereof by the transmission, the other end of the shaft eccentrically communicating with the piston to impart reciprocating motion thereto. Lubricant flow means are provided communicating the sump with the other end of the bore. Valve means are provided at the other end of the bore communicating with conduit means external of the sump for directing lubricant from the sump to the transmission. The valve means are designed to open responsive to pressure exerted thereon to allow lubricant to flow therethrough as the piston reciprocates towards the other end of the bore. The valve means are also designed to close to prevent lubricant from flowing therethrough responsive to the piston reciprocating away from the other end of the bore.

BRIEF DESCRIPTION OF THE DRAWINGS

The invention will become clearer in view of the following description and the accompanying drawings, wherein.

DETAILED DESCRIPTION OF THE PREFERRED EMBODIMENT

Figure 1:
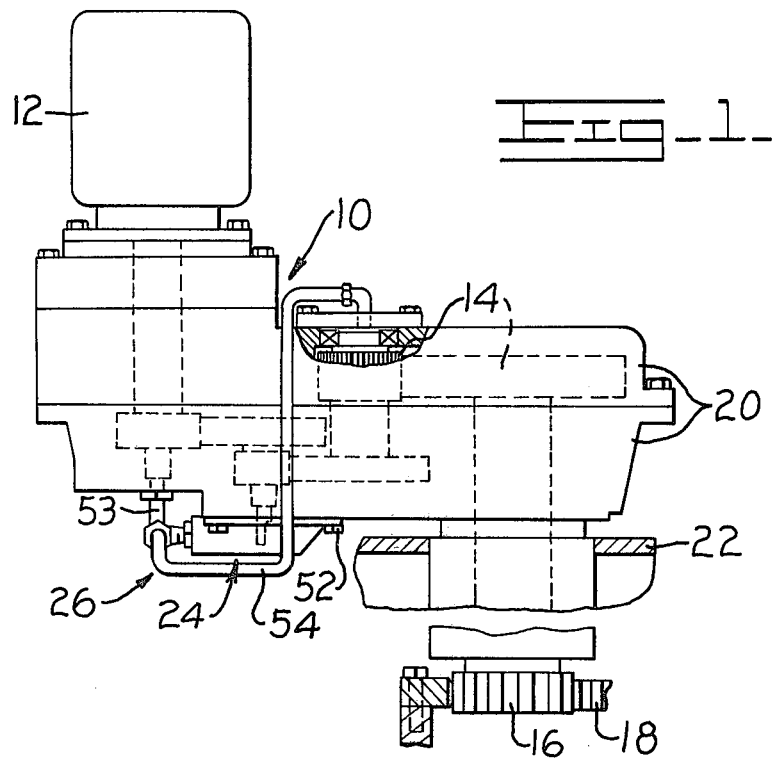
FIG. 1 illustrates in side elevational view, in partial section an excavator swing drive motor and transmission to which the subject lubricating apparatus is attached.

Illustrated in FIG. 1 is a swing drive motor arrangement 10 comprising a fluid motor 12 and coacting power transmission 14 which function jointly through a pinion 16 and ring gear 18 to rotatably position the upper frame unit of an earth-working machine such as an excavator, including a boom mounted digging implement, with respect to the ground traversing mobile under carriage thereof. The mounting and use of the swing drive motor arrangement is fully disclosed and illustrated in U.S. Pat. No. 3,819,018 of Thomas P. Muller and Gary L. Popdan for "Brake Assembly for Excavator Swing Transmission" and the disclosure of said patent is hereby included herein by reference thereto.

The motor 12 and the drive transmission 14 are supported along with the complimenting brake, as is particularly described in U.S. Pat. No. 3,819,018 by a two part housing 20 that is rigidly attached to the revolving upper platform unit 22 of the earth-working machine. A lubricating apparatus 24, in accordance with the present invention, and a lubricating circuit 26 provide lubrication for the internally mounted gears of the power transmission.

Figure 2:
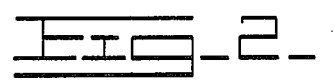
FIG. 2 illustrates an enlarged sectional view taken along line II—II of FIG. 3.
Figure 2:
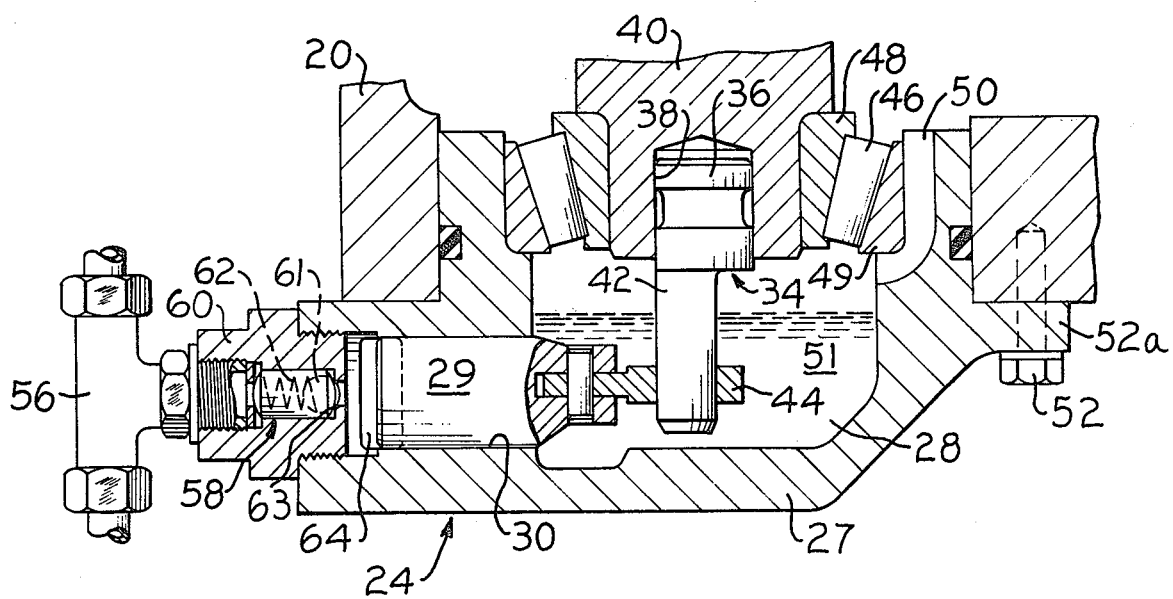
Figure 3:
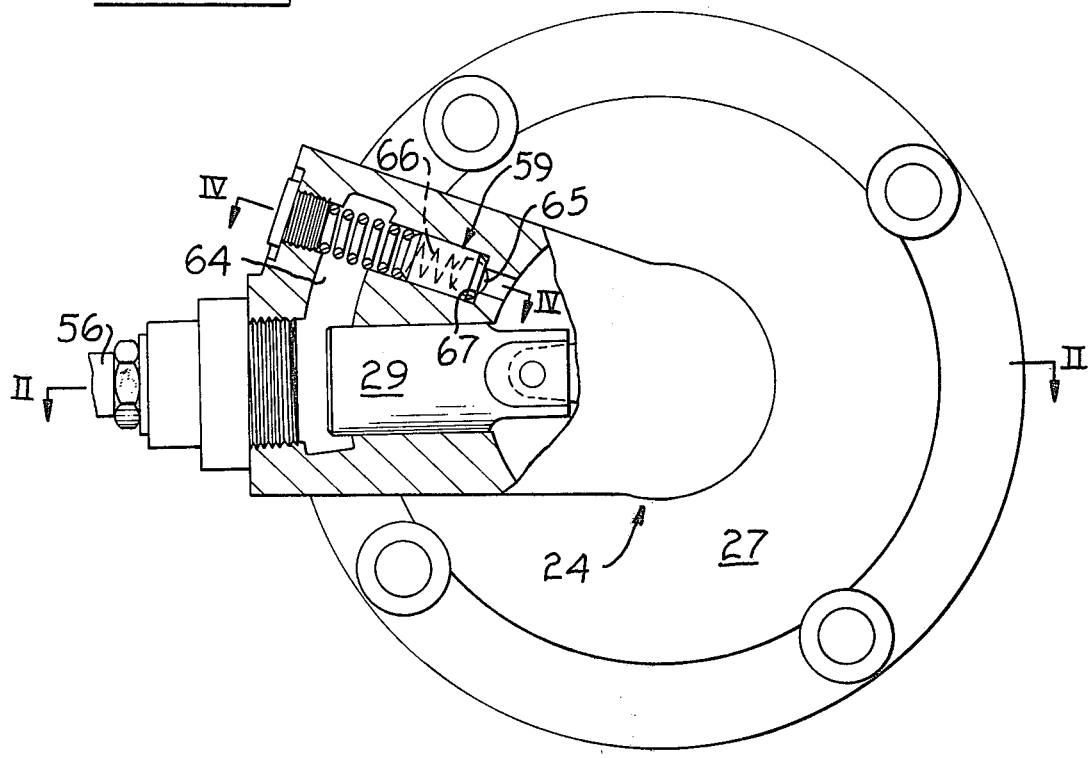
FIG. 3 illustrates in a bottom view in partial section the lubricating apparatus including an associated check valve.
Figure 4:
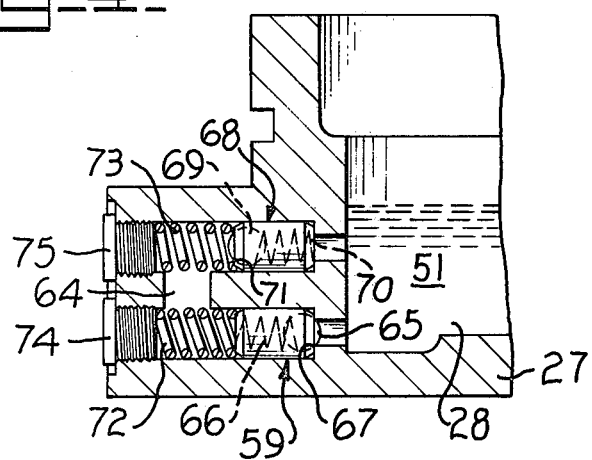
FIG. 4 illustrates a view taken along the line IV—IV of FIG. 3.

Reference to FIG. 2 will lead to a more complete understanding of the structure of the lubricating apparatus 24 of the present invention. The lubricating apparatus comprises a case 27 attached to the bottom of the two part housing 20. The case in combination with the bottom of the two part housing provides a sump 28 which is adapted to receive lubricant from the transmission 14, which fluid is then pumped out through coordinated operation of the piston 29 moving in the bore 30. The piston is caused to reciprocate within the bore by an eccentric drive member 34. The eccentric drive member has an upper head portion 36 thereof that is press fitted within a bore 38 in the end of gear support shaft 40. The eccentricity of the depending drive shaft 42 of the eccentric drive member imparts reciprocating movement to the piston via pin connected floating link 44 in a conventional manner. The case of the lubricating apparatus also serves to mount the bearing 46 thereon that rotatably supports the lower end 47 of the gear support shaft. Appropriate annular spacers 48 and 49 coact with the bearing on the shaft and case sides thereof, respectively. The bearing is, of course, also another end thereof with a passage which communicates with said other end of said bore, said bore refilling valve opening responsive to said piston reciprocating away from said other end of said bore and closing responsive to said piston reciprocating towards said other end of said bore.

3. An improvement as in claim 2, including an annular bearing supported by said case rotatably supporting said shaft.

4. An improvement as in claim 2, including a relief valve communicating at one end thereof with said sump and at the other end thereof with said passage which communicates with said other end of said bore, said relief valve opening responsive to said piston reciprocating toward said other end of said bore only when lubricant cannot be forced passed said valve means and closing responsive to said piston reciprocating away from said other end of said bore.

5. An improvement as in claim 4, wherein said valve means comprises a check valve, said bore refilling valve comprises a check valve and said relief valve comprises a check valve.

6. An improvement as in claim 5, wherein each of said check valves comprises a ball spring loaded against a seat thereof.

* * * * *